2,854,407
DRILLING FLUID AND METHOD

Harvey E. Mallory, Midland, Tex., assignor to Great Western Drilling Company, Midland, Tex., a corporation of Texas No Drawing. Application July 10, 1956
Serial No. 596,815

20 Claims. (Cl. 252—8.5)

This invention relates to improvements in the drilling of wells and is more specifically concerned with the composition, preparation, and use of an improved drilling fluid.

In drilling wells for oil and gas, and particularly when rotary methods are used, it is customary to circulate a fluid through the well and around the drill bit during the drilling operation. Usually, the drilling fluid is an aqueous suspension of solid colloidal matter such as clay, bentonite, etc., these suspensions being known generally as drilling muds. The normal procedure during drilling is to circulate the mud down through the interior of the drill pipe and then back to the surface through the annulus between the drill pipe and the wall of the hole. The drilling fluid issuing from the well is usually passed over a screen and then through a ditch or trough to a mud pit from which it is recirculated through the drill pipe by suitable pumps.

The primary functions of the drilling fluid or mud are to lubricate and cool the drill bit, to deposit solid or gelatinous matter on the walls of the hole thus preventing loss of fluid into the formations adjoining the well, and to carry up drill cuttings to the surface for removal. Another important function of the drilling fluid is to maintain a hydrostatic pressure on the lower portions of the well. The column of fluid exerts a pressure in the well corresponding to the density of the fluid and the height of the column. The pressure exerted by the column prevents escape of gas and oil into the well prior to completion of drilling operations.

In drilling in certain types of formations, particularly in the red shale and red sand sections encountered in West Texas and Eastern New Mexico, extreme difficulty is experienced with the hydratable clays and shales which are characteristic of these formations. In the presence of water, either fresh or salt water, these clays and shales tend to hydrate resulting in a marked increase in the solids content of the drilling mud with a consequent increase in density and viscosity of the mud. For example, if a rotary drilling operation is carried out in a red bed or Permian layer of West Texas, hydration of the red bed clay is encountered and the hydrated clay becomes suspended or dispersed in the drilling mud so that the density of the mud may increase to 11.2–11.5 lbs. per gallon (as compared with a density of 9.7 lbs. per gallon for saturated salt water) with an A. P. I. or Marsh funnel viscosity of 38 to 40 seconds. As a result of this undesirable increase in mud density and viscosity, the drilling rate or rate of penetration is appreciably diminished, "balling up" of the drill bit is a frequent source of annoyance, and it becomes much more difficult to make a trip, i. e. to withdraw the drill pipe from the well and reinstall the same. To avoid all these difficulties, the driller would like to maintain the density of the mud at about 9.9 to 10.5, and preferably 9.9 to 10.1, lbs. per gallon with an A. P. I. viscosity of about 31–33 seconds.

Heretofore, the problem of hydratable clays and shales has usually been met by adding excess water to the drilling mud in order to reduce the viscosity and gel strength of the mud so that the solid particles can settle out. In some cases, it has also been proposed to add a dispersing agent to the mud for the same purpose. However, these expedients have been only partially successful in promoting solids drop-out from the mud, and at best, the solids content of the mud has always been relatively high when drilling through hydratable clay and shale formations. Also, the addition of large amounts of water to the drilling mud aggravates or increases the leaching out of soluble salt sections of the formation, thereby resulting in an uneven hole.

Accordingly, the primary object of the present invention is to provide novel means for effecting drop-out or flocculation of the hydratable clay and shale particles in a drilling mud so as to maintain the density and viscosity of the mud within desired limits. More particularly, the present invention relates to the novel use of guar gum as an additive for drilling muds in order to obtain the foregoing result as well as other important benefits hereinafter described in detail.

Guar, which is known botanically as *Cyamopsis tetragonoloba*, is an annual summer growing legume grown in Pakistan, India, and more recently in the southwestern part of the United States. The guar pod contains seeds which are processed by separating the endosperm from the seed coat and embryo and milling the separated endosperm to obtain a product frequently called guar gum but more correctly referred to as guar flour. Guar flour belongs to the class of complex materials known as galactomannans (also referred to in the literature as mannogalactans), the chief constituent of which is a polysaccharide resembling starch in chemical structure except that on hydrolysis the two hexose sugars, mannose and galactose, are obtained instead of dextrose. It has been reported (JACS, 74, 5140, Oct. 20, 1952) that this complex carbohydrate polymer is a long chain of D-mannopyranose units linked $\beta$-1,4 and having attached thereto on the average on every other D-mannopyranose unit by an $\alpha$-1,6 linkage a D-galactopyranose unit. A typical analysis of an industrial grade guar flour is as follows:

| | Wt. percent |
|---|---|
| Ash | 1.2 |
| Protein | 7.5 |
| Fat | .75 |
| Fiber | 2.5 |
| Moisture | 10.5 |
| Galactomannan | 77.55 |
| | 100.00 |

In accordance with the present invention, when a hydratable clay or shale section is encountered during a drilling operation with a conventional aqueous base drilling mud, guar flour containing galactomannan in its natural unoxidized form is then added to the drilling mud in an amount preferably not greater than about 0.5 lb. per 42 gallon barrel of mud and usually within the range of from about 0.1 to about 0.3 lb. per barrel. One of the important advantages of the invention is the fact that guar flour can be used effectively as a flocculating agent in either fresh or salt water muds. Although the addition of guar flour in the foregoing relatively small amounts is quite adequate to effect flocculation of the hydratable clay and shale solids, it is also an important advantage of the present invention that an increased amount of guar flour, e. g. up to 2 lbs. per barrel of mud, can be added to the drilling mud in order to obtain the additional benefits of guar as a water loss control agent. In these larger amounts, the guar is converted to a viscous material which coats the borehole of the well so as to prevent excessive filtration loss. However, in either event the amount of guar flour added to the drilling mud should not be so great as to make the mud too viscous to recirculate.

Although guar flour may be added as such to the drilling mud, the relatively small amounts required for the flocculating purposes of the present invention make it desirable to provide the guar flour in diluted form, e. g. in admixture with a suitable clay. In this way a more convenient volume or bulk of material is available for easier handling by the driller. In addition, it has also been found that the presence of clay in the mixture tends to prevent lumping of the guar flour when it is added to water or the drilling fluid. Any of the usual clays such as a bentonite clay may be used, and although the relative proportions of guar flour and clay are by no means critical, it has been found that a ratio of 3 parts by weight of guar flour to 1 part by weight of clay provides a highly effective and practical mixture. Guar flour is generally available in the form of a fine milled powder, and for purposes of the present invention, a relatively small particle size is desirable in order to facilitate rapid assimilation of the guar flour in the drilling fluid. However, at the same time, the particle size should not be too fine because of the well known tendency of fine powders to "ball up" and resist wetting by an aqueous fluid. Merely by way of example, the following screen analysis represents a typical useful particle size distribution for the guar flour:

99% through 100 mesh
90% through 140 mesh
65% through 200 mesh
24% through 325 mesh Guar flour in water, like other hydrophilic colloids, is subject to bacterial action on prolonged storage or use. Consequently, it is usually advisable to add a suitable preservative to the drilling fluid after guar flour has been incorporated therein. Any of the usual carbohydrate preservative materials may be utilized, among which may be mentioned sodium benzoate, benzoic acid, formaldehyde, and various phenol derivatives. Particularly useful for this purpose is sodium pentachlorophenate.

In adding the guar flour or guar-clay mixture to the drilling fluid, any suitable or convenient method may be used. For example, the guar flour may simply be added to the mud flowing in the mud ditch or in the mud pits by scattering the powder over the surface. Also, the guar flour may be added through a hopper at the intake side of the mud pump. An alternative method would be to make up an aqueous solution or suspension of the guar flour or guar-clay mixture and add the suspension to the drilling mud either at the mud pit or at the intake to the mud pump.

The use of guar flour for its flocculating effect in accordance with the principles of the present invention is, of course, limited to the case of wells which are being drilled in formations containing sections of hydratable clay or shale. In general, the invention is applicable in the case of any formation having clay or shale which is subject to hydration by and dispersion in the water of the drilling fluid, including either fresh or salt water. As heretofore mentioned, the difficulty is particularly pronounced in the Central Basin Platform and the Midland Basin of West Texas and Eastern New Mexico. In these areas, it is quite common to encounter the so-called red shale or red sand sections which are quite susceptible to hydration. The problem is especially severe when the red shale or red sand is interbedded with anhydrite or salt, as is frequently the case. By way of illustration, the following is a tabulation of the geological sections found in these two areas and from the compositions of these sections it will readily be seen that the hydratable clay or shale problem presents a constant source of difficulty when drilling in these areas:

CENTRAL BASIN PLATFORM

| Geological Name and Thickness of Section, ft. | Composition of Section |
|---|---|
| 0–100 | Caliche. |
| 0–500 | Cretaceous. |
| 35–1,500 (Dockum) | Red shale and red sand. |
| 0–300 (Dewey Lake) | Do. |
| 50–250 (Rustler) | Anhydrite and gypsum. |
| 1,000 (Salada Salt) | Salt with steaks of anhydrite. |
| 200 (Tansill) | Red sand and dolomite at base, some anhydrite and gypsum. |
| 200 (Yates) | Grey and red shale. |
| 650 (Seven Rivers) | Dolomite with anhydrite and gypsum streaks. |
| 250 (Queens) | Dolomite with grey and red shale. |
| 300 (Graysburg) | Dolomite with some grey sand. |

MIDLAND BASIN

| Geological Name and Thickness of Section, ft. | Composition of Section |
|---|---|
| 0–100 | Caliche. |
| 0–500 | Cretaceous. |
| 300–2,250 (Dockum) | Red shale and red sand. |
| 0–490 (Dewey Lake) | Do. |
| 50–80 | Anhydrite and gypsum. |
| 200–1,000 | Salt with streaks anhydrite. |
| 50 (Tansill) | Red sand and dolomite at base, some anhydrite and gypsum. |
| 300 (Yates) | Grey and red shale. |
| 600–800 (Seven Rivers) | Dolomite with anhydrite and gypsum streaks. |
| 500 (Queens) | Red and grey sand with some salt and red shale. |
| 300 (Graysburg) | Dolomite, anhydrite, and gypsum. |

As heretofore mentioned, the principal effect of the addition of guar to the drilling fluid in accordance with the present invention is the promotion of solids drop-out and particularly the flocculation of hydrated clay or shale particles. In this way, highly effective drop-out of the flocculated clay solids is obtained in the mud pits at the ground level, and consequently the mud which is recirculated to the drill bit can be maintained at a desired relatively low density level of from about 9.9 to about 10.5, preferably 9.9 to 10.1, lbs. per gallon with an A. P. I. or Marsh funnel viscosity of from about 31 to about 33 seconds without the use of an excess of water in the mud. Moreover, this desirable result is obtained by the use of a relatively small and inexpensive amount of guar flour which is far below the required quantities of other types of flocculating agents and is also far below the quantity of guar gum or other natural gum required for water loss control purposes.

In addition to the marked flocculating action of guar flour on hydrated or hydratable clay and shale solids, the evidence also seems to indicate that the presence of guar flour may actually retard hydration of the susceptible clays and shales. Although the reason for this is somewhat obscure, it is possible that the greater affinity of the water for guar flour than for clay may contribute to this desirable effect. In any event, it seems probable that clay hydration is actually retarded to some extent as evidenced by the fact that when guar flour is present in the drilling mud the size of the drill cuttings or chips is increased appreciably and the borehole remains quite uniform in size as compared with the results obtained using a conventional drilling mud.

By reason of the decreased extent of clay hydration and the increased flocculation of hydrated clay particles, both of which make it possible to recirculate a relatively low solids content mud having a controlled density and viscosity, all of the difficulties which are normally encountered when drilling through a hydratable clay or shale formation are either eliminated or alleviated to a remarkable extent. Most important of all is the fact that the rate of penetration is enhanced and the bit life is improved to a substantial degree. Furthermore, the usual difficulty with "balling up" of the drill bit is largely avoided. Because of the more favorable density and viscosity properties of the guar-containing mud, it becomes much easier to make a trip when necessary for the purpose of replacing the drill bit or for other reasons. In addition, the increased chip or cuttings size has important advantages to the driller as hereinafter described in more detail.

One of the most important properties of guar flour as used for flocculating purposes in accordance with the present invention is the high degree of solubility or dispersibility of guar in cold water as compared with other natural gums of the same general classification. For example, guar flour is many times more dispersible in water at 25° C. than other galactomannan gums, such as locust bean gum, and also has superior cold water dispersibility as compared with most other types of gums, such as arabic, karaya, tragacanth, etc., and also as compared with the natural gums extracted from seaweed, such as Irish moss extract, sadium alginate, etc. Accordingly, it will readily be understood that guar flour is very convenient to use in the field inasmuch as it requires no heating whatsoever to disperse the same in water or in the drilling mud. Also, on a weight basis, considerably less guar flour is required to obtain the desired flocculating effect than other natural and synthetic flocculating agents.

Of course, one of the most attractive aspects of the use of guar flour in accordance with the present invention is the ease and simplicity with which the driller can maintain the desired control of viscosity, density, and gel strength of the drilling mud under widely varying conditions of use. It is no longer necessary to add to the drilling mud a dispersing agent of questionable effectiveness, or to dilute the drilling mud with large excesses of water with all of the attendant disadvantages heretofore described. On the contrary, the desired control of density and viscosity is achieved entirely by the flocculating action of the added guar flour which prevents the continued build-up or accumulation of clay solids in the recirculating drilling mud.

In addition to the density and viscosity control features which are the principal objectives of the present invention, certain incidental benefits are also realized by the addition of guar flour to the drilling mud. For example, guar flour inherently possesses desirable wall building characteristics with the result that filtration loss is diminished somewhat even though the guar flour is present in the relatively small amounts required for flocculating action. Of course, if water loss control is also an important objective, the amount of guar flour may be increased as previously mentioned or, if desired, other water loss control agents such as starch may be added in the usual manner. However, if the drilling mud happens to contain saturated salt water and a minor amount of oil in emulsion form, the presence of guar flour instead of starch prevents the formation of highly stable foams which are frequently so troublesome with starch-containing drilling muds.

Another benefit or advantage which is inherent in the use of guar flour as a flocculating agent is the fact that the guar-containing mud makes it possible to drill an extremely straight hole which is usually bit size as evidenced by a remarkably uniform profile log of the borehole. When drilling through hydratable clay and salt formations with the usual drilling muds, there is usually a very detrimental erosion or leaching out which occurs in the hole as a result of the adverse effect of water on the clay and salt. Consequently, the borehole frequently has an extremely non-uniform size through these different sections and obviously much greater amounts of cement are required in order to fill the enlarged pockets of the borehole during cementing of the well casing. However, such is not the case when guar is present in the mud. For example, in a pair of offset wells drilled side-by-side in Terry County, Texas, the average hole size through the salt section from 1700 to 4700 feet was 19.5 in. with an 11 in. bit when using a conventional drilling mud. However, with a guar-containing mud as used in the companion well over the same interval the average hole size was 14 in. with a 12¼ in. bit.

In addition to the prevention of density and viscosity increase in the drilling mud, and the relatively uniform borehole size, the other outstanding characteristic which is most apparent to the driller when operating in accordance with the present invention is the relatively large size of the drill chips or cuttings. When drilling through a hydratable clay formation with water or conventional mud as a drilling fluid, the cuttings are invariably powder-like or colloidal in nature. However, with the drilling fluid of the present invention, the cuttings are comparable in size to the initial chip size at the bit, e. g. ½ to 1 centimeter in cross section. As will be readily understood, the larger size cuttings are quite desirable because they drop out faster and more completely during circulation of the mud through the mud pits with the result that there is much less return or recirculation of cuttings to the hole and much less regrinding of the initial cuttings. The relatively large particle size of the cuttings obtained when a guar-containing drilling mud is used is also a distinct advantage to the driller in that positive identification of the geological structure is greatly facilitated by examination of the cuttings. For example, certain types of shale have important significance to the geologist, but if the cuttings are hydrated and are brought to the surface in the form of fine particles, identification of the particular shale layer from the cuttings is impossible. On the other hand, if the cuttings or chips are relatively large in size, it becomes a simple matter for the geologist to recognize or identify the material involved.

Although the flocculating action of certain materials is well known in the art, flocculation of clay particles in a drilling mud has often been considered highly undesirable. For example, it is known that in certain concentrations salt frequently effects flocculation of certain clay particles in a drilling mud and results in an extremely high viscosity which sometimes results in seizing of the drill pipe so that circulation of the drilling mud is choked off and the drill string sometimes twists in half. To overcome this, various additives have been suggested as dispersing agents to prevent or counteract flocculation. In fact, in U. S. Patent No. 2,483,936 oxidized mannogalactan is suggested as a colloidal suspending or dispersing agent for drilling muds. However, I have found that, contrary to what might be expected, galactomannan in its natural or unoxidized form as obtained from guar produces flocculation of hydratable clay and shale solids and such guar-flocculated solids are relatively free-flowing and easily dispersed so that a drilling mud containing guar flocculated clay particles possesses an unexpectedly low viscosity. For this reason, the drilling mud possesses the flow characteristics desired by the driller and, at the same time, the cuttings or chips can settle thoroughly and rapidly during passage of the drilling mud through the mud pits. This unusual, and previously unappreciated, property of guar flocculated clay solids is in marked contrast to the less desirable properties of certain resinous flocculated clays which may be characterized as compact and "liver-like." Although the reason for the difference in properties of the flocculated solids is not entirely clear, it is believed that the non-ionic character of guar flour may be responsible, at least in part, for this highly desirable result as compared with the results obtained when using known cationic resinous flocculants, such as the polyacryloamides, or anionic resinous flocculants, such as the polymaleates.

A further important advantage of guar flour as a flocculating agent for drilling muds is the fact that guar is apparently substantially selective as a flocculant for hydratable clays and does not necessarily result in flocculation of all types of solid materials which may be present in a drilling mud. Thus, with guar flour present as a flocculant in a drilling mud it is possible to add and retain in the recirculating drilling mud other desired solids such as salt water clays or starch which the driller may desire to have present for water loss control or for other reasons. Extensive field tests have shown that these other added solid materials are not flocculated by the presence of guar flour and that only the undesirable hydratable clay or shale particles are knocked out. Other known flocculating agents which might conceivably be used in a drilling mud have the disadvantage of tending to flocculate all solid particles which are present. As will readily be appreciated, the selective flocculating action of guar flour is important to the driller because it increases the utility and flexibility of use of guar in drilling muds.

In order to illustrate and describe the invention more fully, the results of several comparative field tests will now be presented by way of example but not for purposes of limitation. The table below shows the test data from two nearby wells drilled in the Prentice field, Yoakum County, Texas. In each instance the comparison is based on a drilling interval of from ground level to about 4800 ft. In each case 12¼ in. bits were used at 50,000 lbs. on the bit and a rotary speed of 80 R. P. M. The mud pumping conditions were identical. In well A a conventional salt water mud was used. In well B a total of about 1100 lbs. of guar flour was added to the mud in more or less equally spaced increments over the drilling period.

|  | Well A | Well B |
| --- | --- | --- |
| Drilling Fluid | Salt water with salt water clay. | Same +0.3 lbs. per bbl. of guar flour. |
| Density, lbs./gal | 10.8–11.1 | 10.1–10.3. |
| API viscosity, sec | 35–37 | 31–33. |
| Fluid loss (API), cc | 100+ | 100+. |
| Filter cake (API), Inch | 5/32–7/32 | 3/32. |
| Number of drill bits used | 17 | 13. |
| Drilling time, hrs | 168 | 142. |
| Total estimated cost, dollars | 13,700 | 10,700. |

From the foregoing data it will be seen that the presence of guar in well B prevented the undesirable increase in mud density and viscosity which characterized well A. Furthermore, in well B there was an appreciable decrease in number of bits required, total drilling time, and estimated cost of drilling. In addition to the advantages evident from the tabulated data above, it was also noted that the chip size was appreciably larger in the case of well B and the hole size was much more uniform through the red bed section. For example, in the red bed interval from about 500 to about 2100 feet a comparison of the profile logs for the two boreholes showed that in the case of well A the hole diameter was for the most part in excess of 33 in., i. e. off the chart, whereas in the case of well B using guar flour the borehole diameter was mostly between 13 in. and 16 in.

I claim:

1. In the method of drilling through a subsurface hydratable clay or shale formation wherein a drilling mud is continuously circulated through a drill pipe and drilling bit, the improvement which comprises circulating through the drill pipe and drilling bit a drilling mud including an aqueous liquid, a clayey material, and a minor amount of a flocculant comprising unoxidized galactomannan obtained from guar and dispersed in the liquid for flocculating hydratable clay and shale solids, said amount being less than that necessary to substantially reduce filtration loss.

2. The method of claim 1 further characterized in that said flocculant comprises guar flour.

3. In the drilling of a well through a subsurface hydratable clay or shale formation wherein a water base drilling mud is continuously circulated through a drill pipe and drilling bit, the method of controlling the density and viscosity of the mud which comprises adding to the mud and dispersing in the water phase thereof a minor amount of unoxidized galactomannan obtained from guar whereby to effect flocculation and prevent the buildup of hydratable clay and shale solids in the circulating mud, said amount being less than that necessary to substantially reduce filtration loss.

4. The method of claim 3 further characterized in that said unoxidized galactomannan is added in the form of guar flour.

5. In the method of drilling through a subsurface formation containing hydratable clay or shale wherein a drilling mud is continuously pumped through a drill pipe to a drilling bit, returned to a mud pit to allow solid particles to settle out, and then recirculated, the improvement which comprises circulating through the drill pipe and drilling bit a water base drilling mud containing a minor amount of a flocculant comprising guar-derived unoxidized galactomannan for flocculating hydratable clay and shale solids, whereby, in comparison wtih a conventional drilling mud, the build-up of density and viscosity of the mud is substantially retarded, the size of the drill cuttings is substantially increased, the solids dropout in the mud pit is substantially enhanced, and the uniformity of diameter of the hole is improved, said amount being less than that necessary to substantially reduce filtration loss.

6. The method of claim 5 further characterized in that said flocculant comprises guar flour.

7. In the method of drilling through a subsurface hydratable clay or shale formation wherein a drilling mud is continuously circulated through a drill pipe and drilling bit, the improvement which comprises circulating through the drill pipe and drilling bit a water base drilling mud containing not more than about 0.5 lb. per barrel of guar flour as a flocculant for hydratable clay and shale solids.

8. In the method of drilling through a subsurface hydratable clay or shale formation wherein a drilling mud is continuously circulated through a drill pipe and drilling bit, the improvement which comprises circulating through the drill pipe and drilling bit a water base drilling mud containing from about 0.1 to about 0.3 lb. per barrel of guar flour as a flocculant for hydratable clay and shale solids.

9. In the method of drilling through a subsurface formation containing hydratable clay or shale wherein a drilling mud is continuously pumped through a drill pipe to a drilling bit, returned to a mud pit to allow solid particles to settle out, and then recirculated, the improvement which comprises circulating through the drill pipe and drilling bit a water base drilling mud containing a minor amount of a flocculant comprising guar-derived unoxidized galactomannan for flocculating hydratable clay and shale solids, whereby hydratable clay and shale solids are flocculated and dropped out in the mud pit and whereby the mud supplied to the drill pipe and bit is maintained at a density of from about 9.9 to about 10.5 lbs. per gallon and at an API viscosity of from about 31 to about 33 seconds, said amount being less than that necessary to substantially reduce filtration loss.

10. The method of claim 9 further characterized in that said flocculant comprises guar flour.

11. The method of claim 9 further characterized in that said mud contains not more than about 0.5 lb. per barrel of guar flour.

12. The method of claim 9 further characterized in that said mud contains from about 0.1 to about 0.3 lb. per barrel of guar flour.

13. A water base drilling mud containing guar flour comprising unoxidized galactomannan, said guard flour being present in an amount not greater than about 0.5 lb. per barrel of mud.

14. A water base drilling mud containing guar flour comprising unoxidized galactomannan, said guar flour being present in an amount not greater than about 0.5 lb. per barrel of mud, and a preservative for said galactomannan.

15. The mud composition of claim 13 further characterized in that said mud contains from about 0.1 to about 0.3 lb. per barrel of guar flour.

16. A water base drilling mud comprising an aqueous liquid, inorganic suspended solids, from about 0.1 to about 0.3 lb. per barrel of guar flour, and a carbohydrate preservative to prevent bacterial deterioration of said guar flour.

17. The mud composition of claim 16 further characterized in that said aqueous liquid comprises salt water.

18. A water base drilling mud containing a minor amount of a flocculant comprising unoxidized galactomannan obtained from guar, said amount being less than that necessary to substantially reduce filtration loss.

19. The composition of claim 18 further characterized in that said flocculant comprises guar flour.

20. The composition of claim 18 further characterized in that said mud also contains a preservative for said flocculant.

References Cited in the file of this patent

UNITED STATES PATENTS

| | | |
|---|---|---|
| 2,319,705 | Post et al. | May 18, 1943 |
| 2,337,296 | Kennedy et al. | Dec. 21, 1943 |
| 2,417,307 | Larsen | Mar. 11, 1947 |
| 2,483,936 | Roberts | Oct. 4, 1949 |
| 2,604,447 | Cummer et al. | July 22, 1952 |

OTHER REFERENCES

Chemical Abstracts, vol. 44, page 9711, Whistler-Guar, a New Industrial Crop, 1950.

Rogers: Composition and Properties of Oil Well Drilling Fluids, revised edition, pub. 1953 by Gulf Pub. Co. of Houston, Texas, pages 414 to 420.